C. H. SHAPIRO.
HANDSAW.
APPLICATION FILED APR. 28, 1913.
1,085,499.
Patented Jan. 27, 1914.
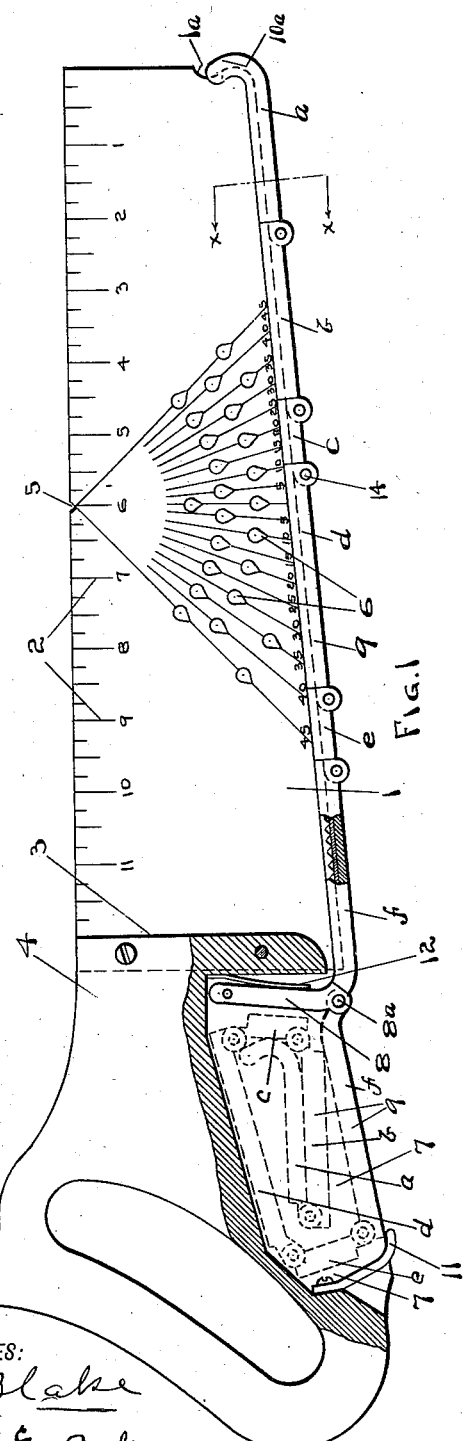
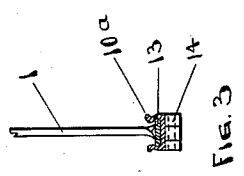
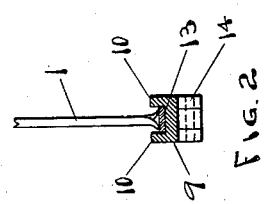
WITNESSES:
C. J. Blake
Harry E. Baker.
INVENTOR
Charles H. Shapiro.
BY
J. K. Smock
ATTORNEY

UNITED STATES PATENT OFFICE.

CHARLES H. SHAPIRO, OF PORTLAND, OREGON, ASSIGNOR OF ONE-HALF TO M. F. BRADY, DAVID N. MOSESSOHN, WILLIAM S. SMALLWOOD, M. MOSESSOHN, T. W. YOUNGER, AND W. J. ZIMMERMAN, ALL OF PORTLAND, OREGON.

HANDSAW.

1,085,499.  Specification of Letters Patent.  Patented Jan. 27, 1914.

Application filed April 28, 1913. Serial No. 763,996.

*To all whom it may concern:*

Be it known that I, CHARLES H. SHAPIRO, a subject of the Czar of Russia, who have declared my intention to become a citizen of the United States, residing at Portland, in the county of Multnomah and State of Oregon, have invented certain new and useful Improvements in Handsaws, of which the following is a specification.

The present invention pertains to an improvement in saws, and has for its object to provide a saw having a shield for the protection of the teeth when not in use.

A further object is to provide a shield for saw teeth which may be readily applied in position and quickly removed, and which may be folded and concealed in the saw handle when the saw is required for use.

A still further object is to provide, in an article of the class described, a rule formed at right angles to the facing of the saw handle to serve as a square.

A still further object is to form on the saw blade a protractor in which are means for directing the working instrument to the line indicated by the work, in combination with a rule.

I accomplish these and other objects by the mechanism illustrated in the accompanying drawing, in which—

Figure 1 is a side elevation of a saw having my improvements applied thereon. Fig. 2 is a transverse sectional view on the line $x$—$x$ of Fig. 1, showing a saw blade with a section through the shield. Fig. 3 shows a modified form of guard having the lateral members 10$^b$ incurved to form retaining elements for the pad 13.

Referring to the drawing in detail, 1 represents a saw blade having upon one face at its upper edge a scale 2, beginning at the face 3, of the handle 4, which is formed at right angles to the back or upper edge of the blade thereby forming a rule and a square, which are always conveniently at hand and ready for the use of the workman. From any point, as the V-shaped notch 5 at the middle of the rule is formed a protractor, the central line of which is drawn at right angles to the back edge of the saw; and the lines at each side thereof are drawn to represent degrees in units of five or multiples thereof. Upon each line is provided an aperture 6 having a V-shaped portion, whose apex is coincident with the line. A pencil or other marking instrument inserted into the aperture will thereby be guided to the exact point desired without requiring the care of the workman.

From the lower edge of the handle 4 is formed a cavity 7, in the base of which at the front end, is pivotally secured a bar 8 which extends to a point in line with the saw teeth. To this bar is secured, on the pivot 8$^a$, a guard or shield 9, having the lateral flanges 10, and conforming in length to the length of the saw blade, the terminal portion 10$^a$ being recurved to engage in the recess 1$^a$ in the end of the blade. The shield is composed of sections $a$, $b$, $c$, $d$, $e$ and $f$, hingedly secured together on pins 14, which permits the sections to be folded outwardly on themselves and the whole to be swung on its pivot 8$^a$ into the cavity 7, as seen in Fig. 1, where it is securely held by the spring 11, while the saw is in use. The section $a$ folds directly upon section $b$, while the short section $c$ acts as a spacer against which the terminal 10$^a$ will lie, with the first two sections folded upon the section $d$, section $e$ acting as a spacer for the sections $d$ and $f$ when the sections are all folded in the cavity 7 at the inner side of the last named section. The guard may be placed upon the teeth of the saw by releasing the spring 11, which permits the former to drop from the cavity 7. When extended along the line of the teeth against the spring 12 the recurved terminal 10$^a$ will be retracted into the recess 1$^a$, holding the guard firmly in position. To prevent injury to the saw teeth I provide in the base of the channel of the guard a layer 13 of cork, felt or other soft material, which will prevent the guard from crushing or dulling the teeth, in case it should be forced upon them. This guard may be cast from brass or stamped from sheet metal, or otherwise constructed, according to the quality and design of the implement. In this manner I have provided a tool of new design having great utility and convenience.

Having described my invention, what I claim is—

1. A device of the character described comprising a saw blade, a handle having a cavity formed from its front edge, secured thereon, and a tooth guard composed of hinged sections pivoted at the front end of said cavity engageable over the toothed edge of the saw, whereby the guard may be folded upon itself and concealed in said cavity.

2. A device of the character described comprising a saw blade having a recessed front end, a handle having a cavity formed from its lower edge, secured thereon, a bar pivoted in the front end of the cavity, a spring holding the bar in retracted position, a tooth guard composed of hinged sections, having a recurved terminal adapted to engage in said recess, pivoted to said bar, whereby the guard may be attached and in turn detached and folded into said cavity.

3. A device of the character described comprising a saw blade having a recessed front end, a handle having a cavity formed from its lower edge, secured thereon, a bar pivoted in the front end of the cavity, a spring holding the bar in retracted position, a tooth guard composed of hinged sections, each having a padded inner face, the whole terminating in a recurved portion adapted to engage in said recess, pivoted to said bar, whereby the guard may be attached and detached and folded into said cavity, and means for releasably securing the folded guard in the cavity.

In testimony whereof I affix my signature in presence of two witnesses.

CHARLES H. SHAPIRO.

Witnesses:
HAZEL A. ARMSTRONG,
DAVID N. MOSESSOHN.